US012362125B2

(12) United States Patent
Jagannathan et al.

(10) Patent No.: US 12,362,125 B2
(45) Date of Patent: Jul. 15, 2025

(54) CARBON NANOTUBE BASED COLD CATHODES FOR X-RAY GENERATION

(71) Applicant: CARESTREAM DENTAL LLC, Atlanta, GA (US)

(72) Inventors: Seshadri Jagannathan, Rochester, NY (US); Lawrence D. Folts, Macedon, NY (US)

( * ) Notice: Subject to any disclaimer, the term of this patent is extended or adjusted under 35 U.S.C. 154(b) by 0 days.

(21) Appl. No.: 17/766,718

(22) PCT Filed: Oct. 16, 2020

(86) PCT No.: PCT/US2020/055887
§ 371 (c)(1),
(2) Date: Apr. 5, 2022

(87) PCT Pub. No.: WO2021/076834
PCT Pub. Date: Apr. 22, 2021

(65) Prior Publication Data

US 2024/0062984 A1 Feb. 22, 2024

Related U.S. Application Data

(60) Provisional application No. 62/916,819, filed on Oct. 18, 2019.

(51) Int. Cl.
*H01J 35/06* (2006.01)
*H01J 9/02* (2006.01)

(52) U.S. Cl.
CPC ............ *H01J 35/064* (2019.05); *H01J 9/025* (2013.01); *H01J 2209/0223* (2013.01)

(58) Field of Classification Search
None
See application file for complete search history.

(56) References Cited

U.S. PATENT DOCUMENTS

2022/0227629 A1* 7/2022 Choi .................... H01M 4/131

* cited by examiner

*Primary Examiner* — Edwin C Gunberg

(57) ABSTRACT

A cathode of an electron emitting device is described, where the cathode comprises a carbon nanotube (CNT); a nano-filler material; and a carbonizable polymer, and where the cathode exhibits increased hardness, is formed by high temperature thermal treatment, and is devoid of a substrate. Also described is a method of forming a cathode of an electron emitting device, where the method comprises a) forming a dispersed mixture comprising a carbon nanotube, a nano-filler material, and a carbonizable polymer in a solvent; b) coating and/or extruding the mixture; c) drying the coated and/or extruded mixture to remove at least a substantial portion of the solvent; and d) subjecting the dried mixture to a high temperature thermal treatment; where the method results in the cathode of an electron emitting device having increased hardness.

36 Claims, 3 Drawing Sheets

CARBON NANOTUBE BASED COLD CATHODES FOR X-RAY GENERATION

FIELD OF THE INVENTION

Provided is a carbon nanotube based cold cathode, which can be used for x-ray generation. Further provided is a multiwalled carbon nanotube based cold cathode that demonstrates improved hardness and high current density, and a manufacturing method for the same.

BACKGROUND

The birth of the electronics industry may be attributed to the invention of the vacuum diode. The 1904 invention of the vacuum diode, which is attributed to Sir John Ambrose Fleming, which gave birth to modern electronics industry, had a very simple architecture, consisting of a glass vacuum tube with two electrodes, an anode and a cathode (see FIG. 1). The cathode, upon heating emits electrons, which is collected by the anode, ensuring the direction of the current flow, when connected to an external circuit.

This basic architecture hasn't changed much, ever since, and have been used in a wide variety of a devices, ranging from radio amplifiers to televisions to early computers, until the invention of the solid state transistors, which enabled miniaturization beyond anything conceivable with vacuum tubes. Today, the primary application of vacuum tube is in the development of x-ray sources for medical and dental applications, and klystron tubes for microwave heating. However, in the recent years, there has been a resurgence in the research activity around the use of vacuum tubes to see if it is possible to utilize the nearly three orders of magnitude greater velocity of electrons in vacuum ($3\times10^{10}$ cm/sec), compared to the velocity of electrons in semiconductors (~$5\times10^{7}$ cm/sec), to break through the current limitations of solid state electronics (1-5). The results are promising, and may be expected to lead to revolutionary new devices and applications, in the rapidly developing area of vacuum nanoelectronics, which are inconceivable with the current solid state semiconductor based technologies (6).

As with all new device technologies, there are a number of chemistry and materials challenges that need to be overcome, in order to realize the incredible potential in this area. One of those key challenges is associated with the cathode, which serves as the source of electrons in the vacuum tube. The technology used in (macro) vacuum tubes to generate electrons from the cathode is heat. The cathodes are heated to an elevated temperature, which, depending on the composition of the cathode, could be >2000° C., to enable them to emit electrons; i.e., it relies on thermionic emission of electrons. In the case of vacuum nanoelectronics, such high temperatures would be detrimental to the operation of the device. Hence, it is generally understood that an alternative approach would be required to generate electrons from the cathode, in the case of vacuum nanoelectronics, and the options are using an electric field (field emission) (1), or light (photo emission)(2, 5), or a combination of the two. At this stage, field emission appears to have progressed farther, due to the discovery of the extraordinary field emission properties of carbon nanotubes, early efforts in device development by the display industry, and the current efforts in utilizing these two developments in miniaturizing x-ray sources. In-spite of the fact that carbon nanotubes have been demonstrated to have a very high field electron emission efficiency, at a low threshold electric field, there is a lack in the market place of carbon nanotube-based field emission devices/products that are successful.

This lack of success of carbon nanotube-based field emission devices is related to the difficulty in creating free standing carbon nanotube-based cathodes, which can survive elevated temperatures and maintain their physical integrity under mechanical stress. Carbon nanotube-based field emission cathodes are generally fabricated by physical or chemical vapor deposition of carbon nanotubes on a well-defined cathode substrate, or by depositing aqueous or non-aqueous formulations of pre-made carbon nanotube slurries on well-defined cathode substrates, followed by specific thermal processing. Even though the two methods are inherently different and produce cathodes that have distinct features, they are united by the need for the presence of a cathode substrate to ensure the physical integrity of the cathode. The choice of the cathode substrate may include additional functionalities such as, for example, thermal and electrical conductivity, but the primary function is to ensure the physical integrity of the cathode. As a result, the lack of adequate physical integrity of the carbon nanotube-based cathode is often masked by the properties of the cathode substrate, under laboratory conditions, unless they are explicitly evaluated. For example, U.S. Pat. No. 10,049,847 discloses a method for manufacturing carbon-nanotube based cathodes, using a graphite adhesive (composed of a graphite filler and a graphite binder) to bond a thin film of the carbon nanotube formulation to a cathode substrate. Key elements here are the substrate requirement and the bonding of the formulation to the cathode substrate. Implicit in these requirements is the indication that the formulation might not be physically stable in the absence of the substrate and adequate bonding of the formulation to the cathode substrate. Consequently, such formulations, and associated processes do not survive the harsh, real world usage conditions in the absence of the substrate. It is important to note that the choice of the cathode substrate (as in the case of U.S. Pat. No. 10,049,847, for example), would be restricted by the specific details of the formulation (referred to as paste in U.S. Pat. No. 10,049,847) that is deposited on the cathode substrate; i.e., there is no formulation that is sufficiently universal, and can enable bonding to any cathode substrate, and the thermal, electrical, physical and mechanical properties of the eventual cathode would be restricted/limited by the thermal, electrical, physical and mechanical properties of the cathode substrate that can be bonded to the formulation (referred to as paste in U.S. Pat. No. 10,049,847). The amenability of the restricted choice of cathode substrates to be bonded to other materials required for fabricating the eventual device (for e.g., an x-ray source), as well the ability of these restricted choices of cathode substrates to survive/perform in the high vacuum conditions of the device (for e.g., $<10^{-9}$ torr) has generally been a major stumbling block in creating a practically useful device. Even though the choice of the cathode substrate is largely dictated by the need for ensuring the physical integrity of the cathode, it is often restricted by the need for maintaining adequate electrical conductivity (or low resistance) between the cathode and the external circuitry, and the ability to function under high vacuum (for e.g., $<10^{-9}$ torr). In order for the cathode to serve its function as an electron source, it needs to be electrically connected to an external power supply, without adding significant resistance to the electrical circuitry. As a result, the choice of the cathode substrate that can provide adequate physical integrity for the cathode, is also restricted by the requirement for high electrical conductivity (or minimal resistance), as well as the need for an adhesive that will maintain these properties of the cathode substrate (high electrical conductivity, physical integrity, and the ability to function under high vacuum (for e.g., <$10^{-9}$ torr)). As a result, it is very difficult to find a combination of adhesives and substrates that can be of practical value, and is one of the key reasons behind the absence of commercially viable products in this area, that utilize the enormous potential offered by carbon nanotubes.

In addition, the use of x-ray imaging in dentistry has not changed significantly since the original demonstration of 2D imaging by William James Morton at a special meeting of the New York Odontological Society in 1896. Neither has the cathode used to generate the electrons in the publication by William Coolidge in 1913 changed significantly. However, there has been significant efforts to improve upon the x-ray imaging modalities in dentistry, such as 3D or near 3D imaging (including chairside tomosynthesis). A critical need for such modalities is a distributed x-ray source. However, creation of distributed x-ray sources require an alternate cathode technology. A popular cathode technology in the literature for distributed x-ray sources is based on the field emission array cathodes demonstrated by Charles Spindt in 1968 (see FIG. 2), which utilizes the field emission behavior of certain materials when subjected to high electric fields, as originally demonstrate by R. W. Wood in 1897.

The demonstration by Baker et al in 1972 that carbon fibers were good candidates for field emission electron sources in a vacuum, and the discovery of carbon nanotubes by Iijima several decades later, has led to flurry of activity in developing carbon nanotube based field emission cathodes (a.k.a. cold cathodes). However, a fundamental challenge that has not been overcome is the development of a formulation and a process that results in such cold cathodes that would demonstrate adequate physical stability and an ability to bond to other materials used in the cathode construction, in a robust manner. The key challenge to the creation of any carbon nanotube based microscopic devices, such as cold cathodes for x-ray generation, is the need to create a composite material containing the active materials, which is physically robust in a high vacuum, high temperature environment, while remaining amenable to stable bonding to electrically conducting and electrically insulated interfaces, under varying thermal conditions.

The approaches taken thus far, may be grouped into two categories.

The first approach utilizes vapor deposition to simultaneously synthesize and deposit carbon nanotubes (of multiple varieties) onto a variety of surfaces/substrates. This approach produces high quality carbon nanotube cathodes, which, however, are not amenable to strong bonding to the surface/substrate, making the eventual device extremely fragile. A second issue, associated with this approach, has been the challenge in creating thick films. Intrinsically, vapor deposition is well suited for thin films, and not thicker films. In order to achieve higher current densities, it is necessary to be able to achieve thicker films.

The second approach, is the so called "paste" approach, where pre-made carbon nanotubes are formulated in aqueous or non-aqueous media, with a variety of additives, and are deposited by screen printing and other methods on a specific substrate to generate a thicker films than those generated by vapor deposition, which is then thermally processed to create the eventual cathode. The choice of additives is quite critical, as they determine the physical properties of the paste (e.g., viscosity), as well as the mechanical, e.g., hardness, electrical, e.g., conductive vs insulating, and thermal, e.g., disintegration temperature, properties of the cathode, without the need for a substrate.

Thus far, it has been found difficult to create a carbon nanotube based cathode that has all the desired properties for a cold cathode, e.g., physical, electrical, thermal, etc., without the need for a substrate, by either of the approaches. Both of the approaches have produced carbon nanotube based cathodes that have current densities ranging from a few microamps/$cm^2$ to a couple of amps/$cm^2$, but none of them appear to provide the required physical and thermal properties, without the need for a substrate. The cathodes are either physically fragile, and fall apart on repeated routine handling, and/or cannot survive the high vacuum in the x-ray tube, and/or cannot be bonded adequately to other, required components, and/or unable to withstand the higher temperature processing requirements in the construction and use of the x-ray tube. All the approaches result in a cathode that falls short in one or more needed performance categories, making it difficult, if not impossible, to construct a carbon nanotube based x-ray tube that is a commercializable product.

Thus, there is a need to develop a formulation and process for creating carbon nanotube-based cathodes, which do not require a support, and can survive elevated temperatures and maintain their physical integrity under mechanical stress, while maintaining its field emission performance.

SUMMARY

In one aspect, a cathode of an electron emitting device is provided, where the cathode comprises a carbon nanotube (CNT); a nano-filler material; and a carbonizable polymer; and wherein the cathode exhibits increased hardness, is formed by high temperature thermal treatment, and is devoid of a substrate. In one embodiment, the carbon nanotube is a multi-walled carbon nanotube (MWCNT). In one embodiment, the multi-walled carbon nanotube is a helical multi-walled carbon nanotube. In one embodiment, the nano-filler material is selected from the group consisting of graphite, silicon carbide, titanium carbide, tungsten carbide, molybdenum carbide, tungsten sulfide, molybdenum sulfide, cadmium sulfide, silicon, silver, copper, titanium, nickel, iron, iron oxide, copper oxide, zinc oxide, and combinations thereof. In one embodiment, the carbon nanotubes and nano-filler material are present at a ratio of about 1:10 to about 1:100 or a ratio of about 1:30 to about 1:50. In one embodiment, the carbonizable polymer is a non-graphitizable polymer. In one embodiment, the carbonizable polymer is selected from polyfurfuryl alcohol, phenol-formaldehyde-based polymer, epoxy-based photoresists, carbon fiber-forming polymer, and combinations thereof. In one embodiment, a monomeric and/or oligomeric form of the carbonizable polymer is used, which forms the carbonizable polymer during the high temperature thermal treatment. In various embodiments, the increased hardness results in a bulk-indentation of less than 0.2 mm when the cathode is subjected to a force at 90 degrees to a long axis of the cathode, from a conical steel probe moving at a constant velocity of 50 mm/minute until a maximum load of 500 grams is reached, or a bulk-indentation of less than or equal to 0.15 mm. In various embodiments, the high temperature thermal treatment comprises forming the cathode in a vacuum or an environment substantially devoid of oxygen, at temperature from about 600° C. to about 1300° C., or from about 900° C. to about 1000° C. In one embodiment, the high temperature thermal treatment occurs in the presence of an inert gas. In one embodiment, the inert gas is argon gas, nitrogen gas, or a combination thereof. In one embodiment, the high temperature thermal treatment comprises heating at a rate of from about 0.1° C. per minute to about 5° C. per minute. In one embodiment, the high temperature thermal treatment comprises a dwell time at the temperature ranging from about 30 minutes to about 3,000 minutes.

In another aspect, a method of forming a cathode of an electron emitting device is provided, where the method comprises a) forming a dispersed mixture comprising a carbon nanotube, a nano-filler material, and a carbonizable polymer in a solvent; b) coating and/or extruding the mixture; c) drying the coated and/or extruded mixture to remove at least a substantial portion of the solvent; and d) subjecting the dried mixture to a high temperature thermal treatment; where the method results in the cathode of an electron emitting device having increased hardness. In one embodiment, the carbon nanotube is a multi-walled carbon nanotube (MWCNT). In one embodiment, the multi-walled carbon nanotube is a helical multi-walled carbon nanotube. In one embodiment, the nano-filler material is selected from the group consisting of graphite, silicon carbide, titanium carbide, tungsten carbide, molybdenum carbide, tungsten sulfide, molybdenum sulfide, cadmium sulfide, silicon, silver, copper, titanium, nickel, iron, iron oxide, copper oxide, zinc oxide, and combinations thereof. In one embodiment, the carbon nanotubes and nano-filler material are present at a ratio of about 1:10 to about 1:100, or a ratio of about 1:30 to about 1:50. In one embodiment, the carbonizable polymer is a non-graphitizable polymer. In one embodiment, the carbonizable polymer is selected from polyfurfuryl alcohol, phenol-formaldehyde-based polymer, epoxy-based photoresists, carbon fiber-forming polymer, and combinations thereof. In one embodiment, a monomeric and/or oligomeric form of the carbonizable polymer is added in step a), and the monomeric and/or oligomeric form of the carbonizable polymer is polymerized to form the carbonizable polymer during the thermal treatment. In various embodiments, the increased hardness results in a bulk-indentation of less than 0.2 mm when the cathode is subjected to a force at 90 degrees to a long axis of the cathode, from a conical steel probe moving at a constant velocity of 50 mm/minute until a maximum load of 500 grams is reached, or a bulk-indentation of less than or equal to 0.15 mm. In one embodiment, the high temperature thermal treatment comprises subjecting the dried mixture to a temperature from about 600° C. to about 1300° C. in a vacuum or an environment substantially devoid of oxygen, or the temperature is from about 900° C. to about 1000° C. In one embodiment, the high temperature thermal treatment occurs in the presence of an inert gas. In one embodiment, the inert gas is argon gas, nitrogen gas, or a combination thereof. In one embodiment, the high temperature thermal treatment comprises heating at a rate of from about 0.1° C. per minute to about 5° C. per minute. In one embodiment, the high temperature thermal treatment comprises a dwell time at the temperature ranging from about 30 minutes to about 3,000 minutes.

DETAILED DESCRIPTION

Figure 1:
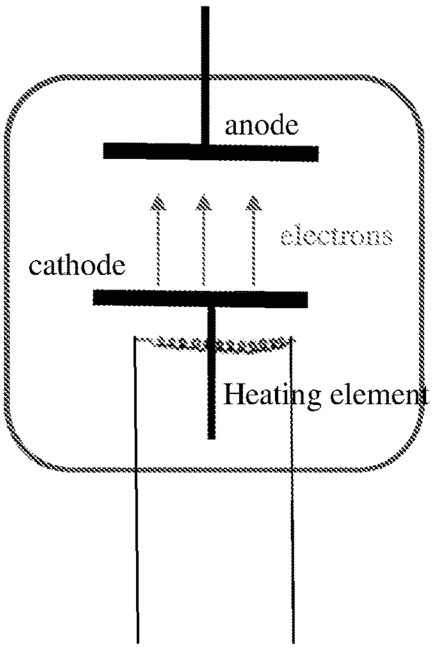
FIG. 1 shows a schematic of a vacuum diode.
Figure 2:
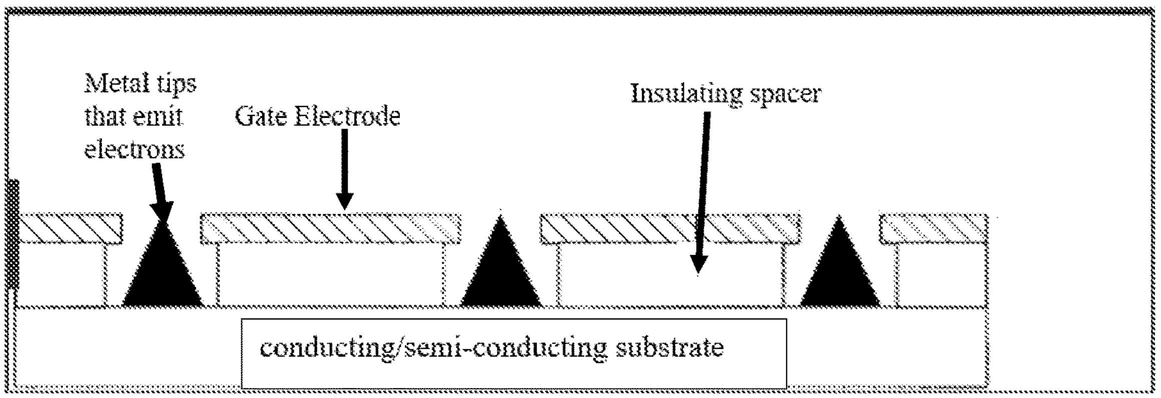
FIG. 2 shows a schematic of cathode technology for distributed sources based on field emission array cathodes.

We have addressed the above described issues by developing a specific formulation and process for creating carbon nanotube-based cathodes, which do not require a support, and can survive elevated temperatures and maintain their physical integrity under mechanical stress, while maintaining its field emission performance. We have discovered that the approach to creating a practically useful cold cathodes has to be fundamentally different from the approaches taken thus far, as further described below.

The "paste" approach to formulating pre-made carbon nanotubes in aqueous or non-aqueous media addresses the issue of being able to create thicker carbon nanotube deposits, than those created by direct vapor deposition, and also provide additives that may serve as "binders" that can hold and improve the physical integrity of the cathode, over that of the cathodes generated by vapor deposition. However, all the paste approaches have a fundamental problem, in that they utilize organic and polymer additives that are used in the general colloid science literature, and do not serve their intended purpose, e.g., physical integrity/stability, or disintegrate upon the thermal processing into entities that do not serve their intended purpose, e.g., physical integrity/stability, or are detrimental to their intended purpose, e.g., physical integrity/stability. So, this requires that a different class of materials has to be used as additives if the intended purpose is to be achieved. These additives have to belong to a class of materials that either retain their properties, e.g., provide the physical integrity/stability of the cathode, or improve upon their initial properties, e.g., provide improved physical integrity/stability of the cathode, upon thermal processing.

The second issue with the paste approach that needed to be addressed was thermal processing. After we identified and chose a special class of materials that either retain or improve upon their intended properties upon thermal processing, it was necessary to discover the appropriate thermal processing conditions, that promotes this behavior.

The third, and equally important issue, is the secure bonding of the carbon nanotube cathodes to the other conducting, semiconducting and insulating materials, required for the fabrication of the eventual device, such as an x-ray tube. The carbon nanotube composite generated by the appropriate choice of materials and thermal processing conditions to be utilizable as a cold cathode, must also be capable of being bonded to a conducting or semiconducting material, so that it can be connected an external electrical source, without failure during use, and to insulating materials, so that the cold cathode is electrically isolated from the anode and other components of the x-ray tube.

Our approach, described herein, overcomes all these three issues, by using additives that result in remarkably enhanced physical and electrical properties of the carbon nanotube based cathodes, upon specific thermal processing conditions, and are receptive to specific additives and processes for bonding to conducting, semi-conducting and insulating materials.

Nanotubes are members of the fullerene structural family. Their name is derived from their long, hollow structure with the walls formed by one-atom-thick sheets of carbon, called graphene. These sheets are rolled at specific and discrete ("chiral") angles, and the combination of the rolling angle and radius decides the nanotube properties, for example, whether the individual nanotube shell is a metal or semiconductor. Nanotubes are categorized as single-walled nanotubes (SWNTs) and multi-walled nanotubes (MWNTs). Multi-walled nanotubes (MWNTs) consist of multiple rolled layers (concentric tubes) of graphene. Individual nanotubes naturally align themselves into "ropes" held together by van der Waals forces, more specifically, pi-stacking. In one embodiment, the carbon nanotube (CNT) used on the formation of the described cold cathode is a multi-walled carbon nanotube (MWCNT). In one embodiment, the carbon nanotube (CNT) used on the formation of the described cold cathode is a helical multi-walled carbon nanotube (MWCNT). In another embodiment, the carbon nanotube (CNT) used in the formation of the describe cold cathode is a carbon nanotube filament or fiber, which is an assembly of carbon nanotubes (CNTs) generated by any fiber/filament extrusion process.

Carbon nanotubes can be functionalized to attain desired properties that can be used in a wide variety of applications. The two main methods of carbon nanotube functionalization are covalent and non-covalent modifications. Because of their hydrophobic nature, carbon nanotubes tend to agglomerate hindering their dispersion in solvents or viscous polymer melts. The resulting nanotube bundles or aggregates reduce the mechanical performance of the final composite. Thus, the choice of solvent can be important. Any solvent in which the carbon nanotubes can be dissolved and/or dispersed with adequate colloidal stability, and can be removed easily by thermal evaporation that are generally used in industrial coating processes, such as ethanol, methanol, acetone, methyl ethyl ketone, ethyl acetate, may be used. The following link provides a detailed summary of solvents that are useful in industrial coatings. (https://coatings.specialchem.com/selection-guide/select-solvents-for-industrial-coatings). In one embodiment, methylene chloride is used as the solvent.

By addition of a nano-filler to fill voids, the mechanical, thermal, and electronic properties of a CNT composition can be improved. Filler materials can be any inorganic, conductive and/or semi-conductive particles that allow for a coating formulation of adequate viscosity to be generated. In one embodiment, an adequate viscosity can be in the range of 5,000 to 50,000 cps. Exemplary filler materials include silicon carbide, titanium carbide, tungsten carbide, molybdenum carbide, tungsten sulfide, molybdenum sulfide, cadmium sulfide, silicon, silver, copper, titanium nickel, iron, iron oxide, copper oxide, zinc oxide, etc. In one embodiment, graphite nanoparticles are used as a filler. In one embodiment, the carbon nanotubes and filler are combined at a ratio of about 1:10 to about 1:100. In one embodiment, the carbon nanotubes and filler are combined at a ratio of about 1:30 to about 1:50.

In addition to the above described filler, a carbonizable polymer, or its monomeric and/or oligomeric version thereof, is also used, which provides the appropriate colloidal stability to the composition to enable coating and/or extrusion of the physical structure, and the eventual structural integrity to the resulting solid, upon thermal processing. In this regard, the carbonizable polymer, and/or its monomeric and/or its oligomeric version thereof, may be regarded as a precursor material, for the final constituent in the processed solid. In one embodiment, the precursor polymer is formed from furfuryl alcohol under suitable conditions. Others useful carbonizable polymers include non-graphitizable polymers such as the phenol-formaldehyde-based polymers, which are synthetic polymers obtained by the reaction of phenol or substituted phenol with formaldehyde, epoxy-based photoresists (https://en.wikipedia.org/wiki/SU-8 photoresist), and carbon fiber forming polymers such as polyacrylonitrile and pitch (petroleum based, coal based, naphthalene based, and/or synthetic). (for description of carbonizable and graphitizable polymers, see Sharma, S. (2018). Glassy Carbon: A Promising Material for Micro- and Nanomanufacturing. *Materials,* 11(10), 1857; a description of polymer-derived carbon is provided in the above reference (section 4 of the article—" . . . graphitizing carbons are those polymers-derived carbons that can potentially be converted into polycrystalline graphite by heat treatment, . . . " . . . " . . . non-graphitizing carbon with a high purity that has experience at least some coking during pyrolysis is known as glassy carbon . . . .")). In one embodiment, furfuryl alcohol may be used, and thermally polymerized with or without the use of additional catalysts to generate polyfurfuryl alcohol or pre-polymerized furfuryl alcohol may be used. The monomeric or the oligomeric or the polymeric versions of the carbonizable polymer is mixed with the CNT and the filler(s), and coated and/or extruded to form a one dimensional (fiber/filament) or a two dimensional (sheet) entity. In either case, the coated and/or the extruded entity may be formed on a solid support, which is subsequently removed upon the evaporation of the solvent used in the formulation, prior to subsequent thermal treatment.

After polymerization or use of a pre-formed polymer, the composition is then subjected to a thermal treatment step. After coating or extruding the formulation and drying it to remove the solvent, the coated/extruded material is subjected to a thermal treatment step to carbonize the polymer in the coated/extruded material. The solid support on which the formulation is coated and/or the extruded entity is formed is removed either immediately after the removal of the solvent or after a specific sequence of thermal treatments, after which the free standing coated/extruded entity is subjected to further thermal treatment. In one embodiment, the thermal treatment occurs in a vacuum or substantially devoid of oxygen. In one embodiment, the thermal treatment occurs in the presence of an inert gas, such as argon or nitrogen gas. In one embodiment, the thermal treatment comprises subjecting the composition to heat from about 600° C. to about 1300° C. In one embodiment, the thermal treatment comprises subjecting the composition to heat from about 900° C. to about 1000° C. In various embodiments, the rate of heating ranges from about 0.1° C. per minute to about 5° C. per minute. In various embodiments, the dwell time at the elevated temperature ranges from about 30 minutes to about 3000 minutes.

Figure 3:
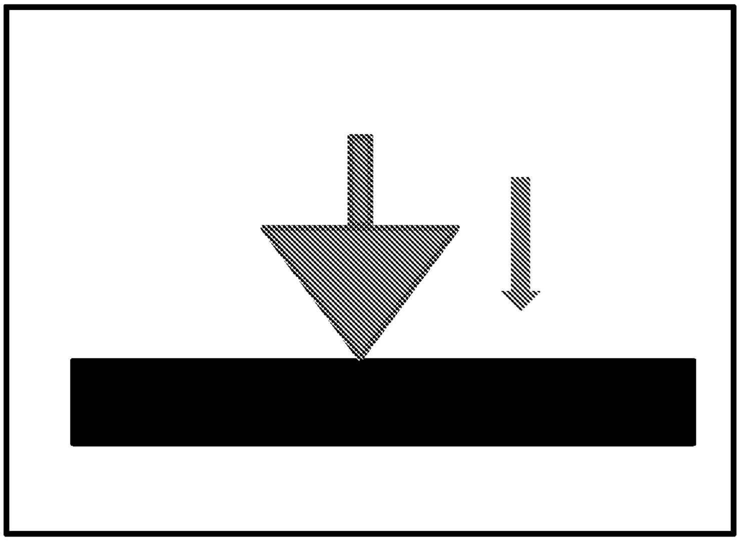
FIG. 3 shows a schematic of a bulk indentation assay used to measure of the hardness of a sample.

To evaluate the physical integrity of the cathodes generated according to the described formulation and procedure, in comparison to what is disclosed in the literature, e.g., U.S. Pat. No. 10,049,847 B2) and references 7, 8, we used a bulk indentation testing procedure. Bulk indentation was used to provide a measure of the "hardness" of each sample type. In these experiments, a 90 degree conical steel probe is lowered at a fixed velocity until contact is made with a flat piece of each sample (See FIG. 3). Once contact is made, the probe continues to push downward at a constant velocity of 50 mm/minute until a maximum load of 500 grams is reached. The probe is then retracted from the sample, and the force and displacement data is collected and plotted, to determine the displacement at the maximum load point.

Figure 4:
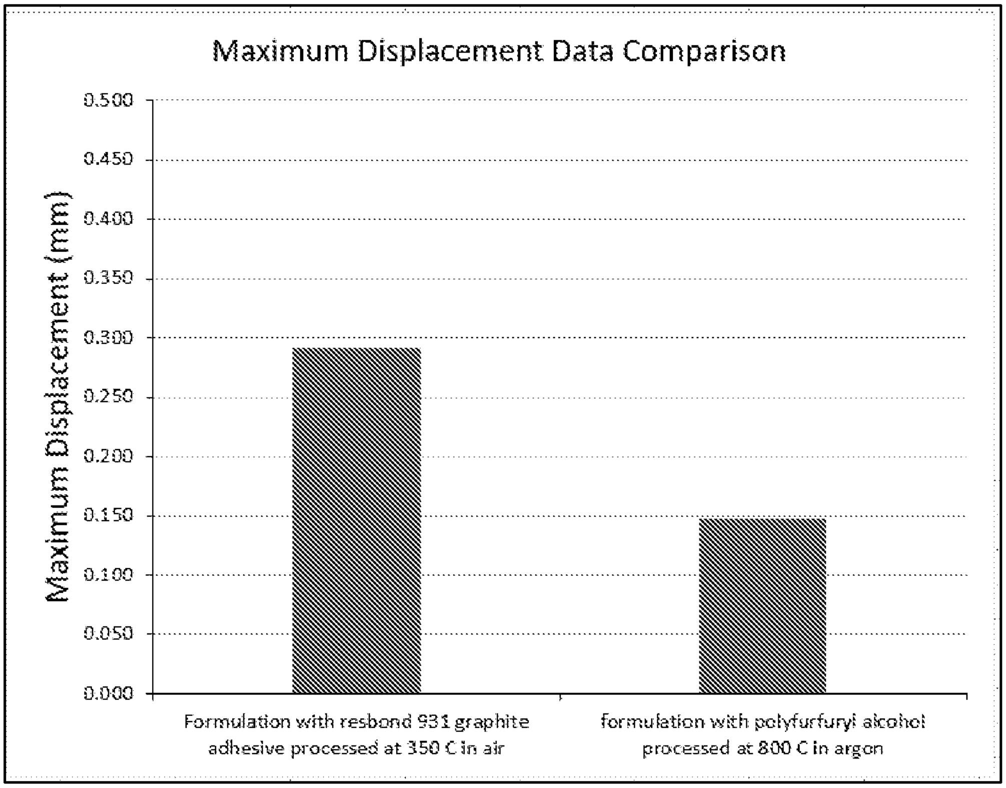
FIG. 4 shows maximum displacement data from a bulk indentation assay for a cathode according to one embodiment (right) and a prior art cathode (left).
Figure 5:
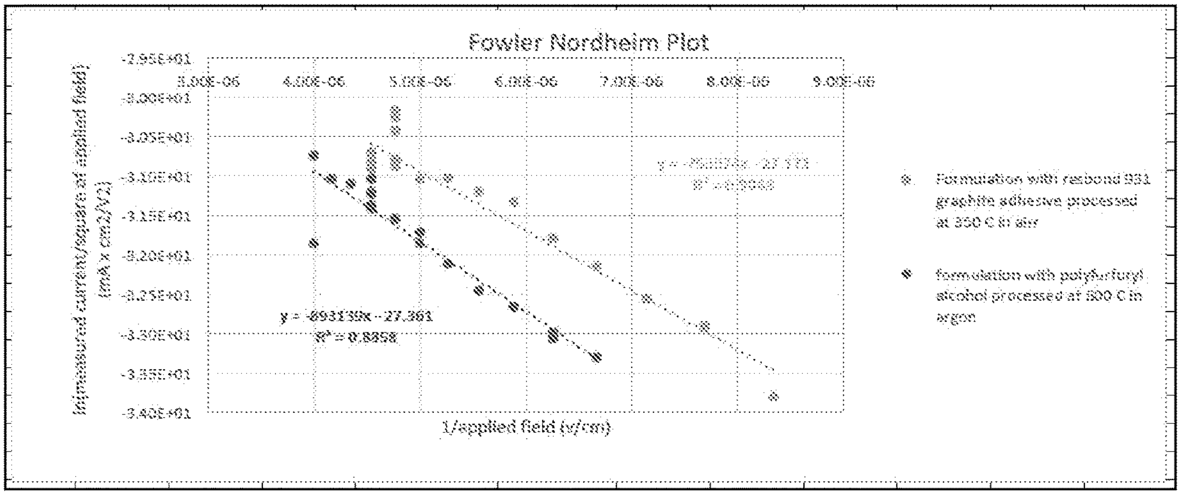
FIG. 5 shows field emission performance of a cathode according to one embodiment (bottom; purple) and a prior art cathode (top; green).

Our inventive formulation and process resulted in a cathode that exhibited half the bulk indentation (for the constant 500 gram load) (FIG. 4, right bar) as compared to what would be seen for a literature formulation and process (FIG. 4, left bar). Under routine handling conditions, the cathode generated using the literature formulation and process cracks and falls apart, while the cathode from the inventive formulation and process, maintains it physical integrity. The field emission performance of the cathodes from the literature and our invention is essentially similar, when evaluated by the Fowler Nordheim theory (9) (FIG. 5). However, as described above, cathodes from the literature cracks and falls apart under routine handling conditions.

What is claimed is:

1. A cathode of an electron emitting device, the cathode comprising a carbon nanotube (CNT);

a nano-filler material; and a carbonizable polymer;

wherein the cathode is formed by a high temperature thermal treatment comprising forming the cathode at a temperature from about 600° C. to about 1300° C. in a vacuum or an environment substantially devoid of oxygen, and wherein the cathode is devoid of a substrate.

2. The cathode of claim 1, wherein the carbon nanotube is a multi-walled carbon nanotube (MWCNT).

3. The cathode of claim 2, wherein the multi-walled carbon nanotube is a helical multi-walled carbon nanotube.

4. The cathode of claim 1, wherein the nano-filler material is selected from the group consisting of graphite, silicon carbide, titanium carbide, tungsten carbide, molybdenum carbide, tungsten sulfide, molybdenum sulfide, cadmium sulfide, silicon, silver, copper, titanium, nickel, iron, iron oxide, copper oxide, zinc oxide, and combinations thereof.

5. The cathode of claim 1, wherein the nano-filler material is graphite.

6. The cathode of claim 1, wherein the carbon nanotubes and nano-filler material are present at a ratio of about 1:10 to about 1:100.

7. The cathode of claim 6, wherein the carbon nanotubes and nano-filler material are present at a ratio of about 1:30 to about 1:50.

8. The cathode of claim 1, wherein the carbonizable polymer is a non-graphitizable polymer.

9. The cathode of claim 8, wherein the carbonizable polymer is selected from polyfurfuryl alcohol, phenol-formaldehyde-based polymer, epoxy-based photoresists, carbon fiber-forming polymer, and combinations thereof.

10. The cathode of claim 1, wherein the carbonizable polymer is polyfurfuryl alcohol.

11. The cathode of claim 1, wherein the cathode exhibits an increased hardness characterized by a bulk-indentation of less than 0.2 mm when the cathode is subjected to a force at 90 degrees to a long axis of the cathode, from a conical steel probe moving at a constant velocity of 50 mm/minute until a maximum load of 500 grams is reached.

12. The cathode of claim 11, wherein the increased hardness results in a bulk-indentation of less than or equal to 0.15 mm.

13. The cathode of claim 1, wherein the high temperature thermal treatment occurs in the presence of an inert gas.

14. The cathode of claim 13, wherein the inert gas is argon gas, nitrogen gas, or a combination thereof.

15. The cathode of claim 1, wherein the temperature is from about 900° C. to about 1000° C.

16. The cathode of claim 1, wherein the high temperature thermal treatment comprises heating at a rate of from about 0.1° C. per minute to about 5° C. per minute.

17. The cathode of claim 1, wherein the high temperature thermal treatment comprises a dwell time at the temperature ranging from about 30 minutes to about 3,000 minutes.

18. The cathode of claim 1, wherein a monomeric and/or oligomeric form of the carbonizable polymer is used, which forms the carbonizable polymer during the high temperature thermal treatment.

19. A method of forming a cathode of an electron emitting device, the method comprising:

a) forming a dispersed mixture comprising a carbon nanotube, a nano-filler material, and a carbonizable polymer in a solvent;

b) coating and/or extruding the mixture;

c) drying the coated and/or extruded mixture to remove at least a substantial portion of the solvent; and d) subjecting the dried mixture to a high temperature thermal treatment comprising subjecting the dried mixture to a temperature from about 600° C. to about 1300° C. in a vacuum or an environment substantially devoid of oxygen;

wherein the method results in the cathode of an electron emitting device.

20. The method of claim 19, wherein a monomeric and/or oligomeric form of the carbonizable polymer is added in step a), and the monomeric and/or oligomeric form of the carbonizable polymer is polymerized to form the carbonizable polymer during the thermal treatment.

21. The method of claim 19, wherein the carbon nanotube is a multi-walled carbon nanotube (MWCNT).

22. The method of claim 21, wherein the multi-walled carbon nanotube is a helical multi-walled carbon nanotube.

23. The method of claim 19, wherein the nano-filler material is selected from the group consisting of graphite, silicon carbide, titanium carbide, tungsten carbide, molybdenum carbide, tungsten sulfide, molybdenum sulfide, cadmium sulfide, silicon, silver, copper, titanium, nickel, iron, iron oxide, copper oxide, zinc oxide, and combinations thereof.

24. The method of claim 19, wherein the nano-filler material is graphite.

25. The method of claim 19, wherein the carbon nanotubes and nano-filler material are present at a ratio of about 1:10 to about 1:100.

26. The method of claim 25, wherein the carbon nanotubes and nano-filler material are present at a ratio of about 1:30 to about 1:50.

27. The method of claim 19, wherein the carbonizable polymer is a non-graphitizable polymer.

28. The method of claim 27, wherein the carbonizable polymer is selected from polyfurfuryl alcohol, phenol-formaldehyde-based polymer, epoxy-based photoresists, carbon fiber-forming polymer, and combinations thereof.

29. The method of claim 19, wherein the carbonizable polymer is polyfurfuryl alcohol.

30. The method of claim 19, wherein the cathode exhibits an increased hardness characterized by a bulk-indentation of less than 0.2 mm when the cathode is subjected to a force at 90 degrees to a long axis of the cathode, from a conical steel probe moving at a constant velocity of 50 mm/minute until a maximum load of 500 grams is reached.

31. The method of claim 30, wherein the increased hardness results in a bulk-indentation of less than or equal to 0.15 mm.

32. The method of claim 19, wherein the high temperature thermal treatment occurs in the presence of an inert gas.

33. The method of claim 32, wherein the inert gas is argon gas, nitrogen gas, or a combination thereof.

34. The method of claim 19, wherein the temperature is from about 900° C. to about 1000° C.

35. The method of claim 19, wherein the high temperature thermal treatment comprises heating at a rate of from about 0.1° C. per minute to about 5° C. per minute.

36. The method of claim 19, wherein the high temperature thermal treatment comprises a dwell time at the temperature ranging from about 30 minutes to about 3,000 minutes.

* * * * *